United States Patent [19]

Lahtinen

[11] Patent Number: 5,351,235
[45] Date of Patent: Sep. 27, 1994

[54] METHOD FOR RELAYING INFORMATION IN AN INTEGRATED SERVICES NETWORK

[75] Inventor: Pekka Lahtinen, Kauniainen, Finland

[73] Assignee: Telenokia Oy, Espoo, Finland

[21] Appl. No.: 937,839

[22] PCT Filed: Feb. 11, 1992

[86] PCT No.: PCT/FIG2/00035
§ 371 Date: Oct. 13, 1992
§ 102(e) Date: Oct. 13, 1992

[87] PCT Pub. No.: WO92/14329
PCT Pub. Date: Aug. 20, 1992

[30] Foreign Application Priority Data

Feb. 12, 1991 [FI] Finland .................................. 910682

[51] Int. Cl.$^5$ .............................................. H04Q 7/00
[52] U.S. Cl. .................... 370/58.1; 370/95.1; 455/53.1
[58] Field of Search ............... 370/110.1, 94.1, 95.1, 370/58.1; 379/59, 60, 63; 455/33.1, 53.1, 54.1

[56] References Cited

U.S. PATENT DOCUMENTS

5,136,585 8/1992 Nizamuddin et al. ............ 370/110.1
5,204,861 4/1993 Wiebe .................................. 370/110.1

Primary Examiner—Benedict V. Safourek
Assistant Examiner—Min Jung
Attorney, Agent, or Firm—Cushman Darby & Cushman

[57] ABSTRACT

A method to be implemented in an integrated services network, such as the well known ISDN, GSM or CMS88 type networks, takes advantage of short message service technology to enable communication between terminal equipment units, i.e., between people using the network. This method makes possible (a) the use of a short message service to provide automatic answer transmission; (b) the use of a specified memory area, from which the content of the automatic answer transmission is automatically fetched; and (c) the storing, in advance, within the specified memory area, of any useful information for any potential caller, i.e., a calling subscriber. The calling subscriber will in turn automatically receive information, e.g., on how to reach the person not attending the terminal device for the moment, or any other such useful information. The short message service scheme permits the sending of short messages from a call originating device to a call terminating device, even when the user of the call terminating device is not answering the call.

11 Claims, 6 Drawing Sheets

METHOD FOR RELAYING INFORMATION IN AN INTEGRATED SERVICES NETWORK

BACKGROUND OF THE INVENTION

1. Field of the Invention

The present invention relates to a method for relaying information in an integrated services network, in which network a message switching service is operated between terminal equipment connected to the network.

2. Description of the Related Art

The type of telephone and data networks are currently use and those presently being designed are digital integrated services networks and normally support both audio communication and digital signal processing. Integrated services networks, as understood in the present context, are networks wherein access to both sound (audio) and digital signal communication channels can be established using basic terminal equipment. Different services can thus be provided which take advantage of this division between digital signal and audio communication channels.

Recent land mobile networks, such as the GSM network designed for Europe, operates in the 900 MHz range. The CMS88 mobile phone system is designed for the United. Both these systems have communication modes digital TMDA. Such networks provide high quality speech signal as well for the capability of transfer and intermediate storage of data on data channels of different types and different rates.

In addition to handling subscriber traffic, a mobile phone system needs an efficient data transmission service to handle diversifying forms of service and complex signalling therein. Thus for instance short message service (SMS) for example, is such a service and can be included in the above networks. A short message service center (SC) is a part of this service and provides receiving and transmitting of messages in digital form one the basis of the so-called "store-and-forward" principle, from one mobile phone to another mobile phone. Signal processing is possible simultaneously with another because short messages are transmitted, as in an integrated services network for instance, over the signalling channel of the GSM network and, not a voice channel.

A corresponding message switching service is also possible in a digital ISDN telephone network as defined by the CCITT, which has both voice channels and signal channels.

The purpose of message switching is to improve the accessibility of terminal equipment subscribers. The specifications for short message transmission in the GSM network, such as GSM 03.40 do not bring about an interface between the MSC and the SC, the structure of the SC, or the different forms of the actual use of the short message service. The communication between the MSC and the SC can instead be realized for instance using an X.25-based packet switching network. In connection there a short message is provided having an effective length of 140 bytes (8 bits).

Furthermore, short message services divided into mobile terminated (MT) services, mobile originated (MO) services, and cell broadcast (CB) services. In cell broadcast service, a message is transmitted in the area of one or more cells to all mobile phones in that area.

SUMMARY OF THE INVENTION

The present invention is concerned with the utilization of this new form of service in the best possible way, so that the availability of the users of the integrated services network and their access of information is crucially improved and so that the speech communication between the users of the voice channels is even partly replaceable by sophisticated informatory auxiliary functions.

One embodiment of the invention is based on the fact that people have a fairly large quantity of personal communication information: telephone numbers, postal addresses, physical addresses, telefax, telex and teletex numbers, etc. Typically, a subgroup of this type of contact information, believed to be meaningful, would be is compiled on a person's visit card which card is distributed to others to facilitate communication. As telephone and data transmission traffic moves into extensive digital integrated services networks, it is foreseen that communication through these networks will rapidly increase. Under present techniques there is no versatile way of transmitting the above contact information in a network when for instance the communication should fail for some reason.

In implementing for example contact information in the new Public Land Mobile Network (PLMN) phone systems, such as the GSM network, and for utilizing the signal processing connections of integrated services networks, particularly in all cases where data acquisition is to be arranged for transmission through the network, the present system of the invention is characterized in that using a terminal equipment unit of the network, information is inquired, via the network, of another terminal equipment connected to the network by means of a query message including at least a reply address;

that the terminal equipment that is the target of the query generates a message containing data previously stored therein by the user of said equipment;

and that the information is transmitted to the reply address automatically via the message switching service of the network.

PREFERRED DESCRIPTION OF THE DRAWINGS

The invention will now be explained with reference to the accompanying drawings, wherein.

DETAILED DESCRIPTION OF THE PREFERRED EMBODIMENT

Figure 1:
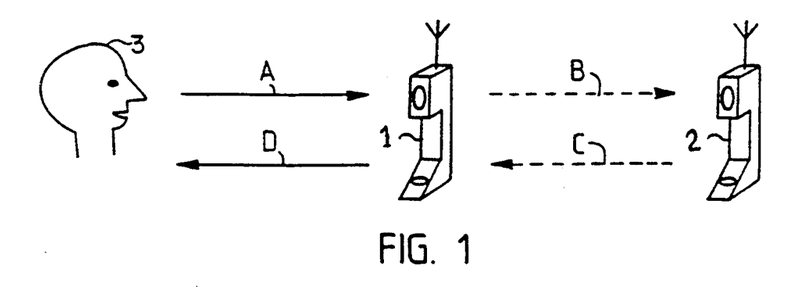
FIG. 1 shows a short message service system according to one embodiment of the present invention.

The embodiment of FIG. 1 shows a simple model of communication information services in terminal equipment, in this case mobile phones, in an integrated services network, from the point of view of the actual user of the mobile phones. Therein the holder 3 of telephone 1 attempts to reach the holder of telephone 2. Arrow A indicates an operation wherein the person 3 is feeding a PLMN number and communication information request of telephone 2 into his own telephone 1. Arrow B indicates the forwarding of the communication information request as a short message from telephone 1 to telephone 2. When telephone 2 identifies the communication information request, it automatically transmits the communication information stored in its memory as a short message C back to telephone 1 wherefrom the information can be unloaded (arrow D) by the user 3 at any time. Many alternative or optional ways of realization can be connected to this basic transaction.

Assuming that telephone sets 1 and 2 used are still connected to the PLMN network, telephone 2 for instance can indicate to its user that a contact information request B has arrived, and only after the user has accepted the request (for instance having first looked at the number or other identification of the maker of the contact information request in a manner known per se) will the call-back transmission C take place. Furthermore, contact information can be provided in different setups for different situations, including being picked up separately from a larger quantity of information for a certain transmission.

The purpose of the distribution of communication information is to make the communication between mobile phone users easier, including facilitating contacts by other communication techniques in addition to voice telephone calls. By knowing the number of the mobile phone of a user, one can acquire for instance the user's telefax number or electronic mail address for leaving messages, or his postal address for delivering arbitrary material.

For instance in connection with a GSM network such a feature is very useful, since the GSM phone is envisioned to become an essential channel of communication between business people, as the increase in people's mobility which is to be anticipated increases the requirements on the distribution of contact information.

Figure 2:
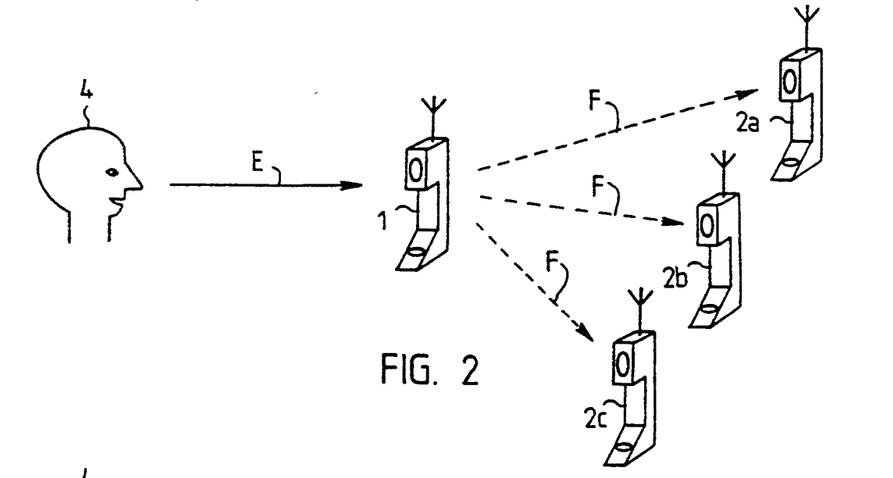
FIG. 2 shows a way to handle distribution of new or changed information to others connected to the service in the manner shown in FIG. 1.

FIG. 2 shows how the CB or MO and the MT facility possibly included in the short message system can be taken advantage of in the distribution of new or changed information relating to mobile phone 1 to other telephones 2a . . . 2c connected to the service. Therein the user 4 feeds (arrow E) updated communication information into his telephone 1, whereafter a cell broadcast (arrows F) to the other telephones 2a . . . 2c in the cell is effected. The changed information is addressed to all telephones in the cell (in which case the receiving telephone is capable of selecting what information is of interest, for instance on the basis of its internal telephone directory), or only to the telephones existing in the internal telephone directory of telephone 1 using the MO and MT facility.

It should be noted in the context of FIGS. 1 and 2 that the short message service center (SC) transmits all communication information short messages which are transferred from one telephone to another, but for clarity this feature is not shown. This means that the communication information requests can be made and received independently of whether other telephones. For instance, a failed call attempt can at least partly be replaced by storing the communication information of the other subscriber for later contact. The receiving and handling of short messages is automatic, so that it will not interfere with an ongoing call, for instance. The supplementary services to be generated using short messages can be services generated to be customer-specific, carrying out a precisely defined task, such as the transmission of taxi calls sent as short messages to vehicles, with an their acknowledgement from these vehicles in short message form. The task of the service center SC in this case would be to locate the nearest vacant vehicles to serve a specific address, whereafter the call will be automatically transmitted to the vehicles which acknowledge the call either by accepting or declining it.

Figure 3:
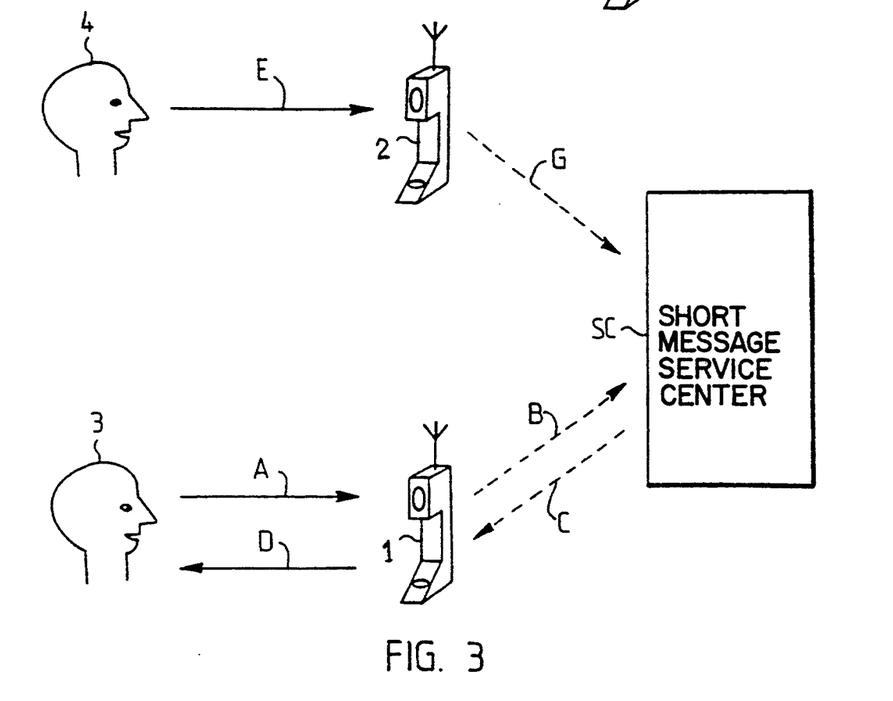
FIG. 3 shows a short message service system according to another embodiment of the present invention and a corresponding way of handling the distribution of changed information.

In the communication information service according to another embodiment of the invention presented in FIG. 3, the communication information of the subscribers has been centralized in the internal database of the SC, and thus it replies to communication information queries and receives updating information. Thus, as the holder 3 of telephone 1 desires the communication information of telephone 2, arrow A indicates an operation wherein the person 3 feeds a PLMN number and communication information request for telephone 2 into his own telephone 1. Arrow B shows the travel of the communication information request as a short message from telephone 1 to the service center SC. When the SC identifies the communication information request, it automatically transmits the communication information stored in its database as a short message C back to telephone 1 wherefrom the information can be unloaded (arrow D) by the user 3 at any time. Thus the procedure is fully analogous to the sequence of FIG. 1.

When the user 4 of telephone 2 feeds (arrow E) updated communication information into his telephone 2, the telephone routes (arrow G) the information in this case to the service center SC, which updates its own internal database. It is not necessary to notify users of information changes separately. Alternatively, only telephones storing an updated number in their own memory are to be informed of changes. The service center SC can, for instance, continually collect in its internal memory a list of those mobile phones that have requested the communication information of a certain mobile phone; when this communication information then changes, the change can be notified of in the manner described.

Figure 4:
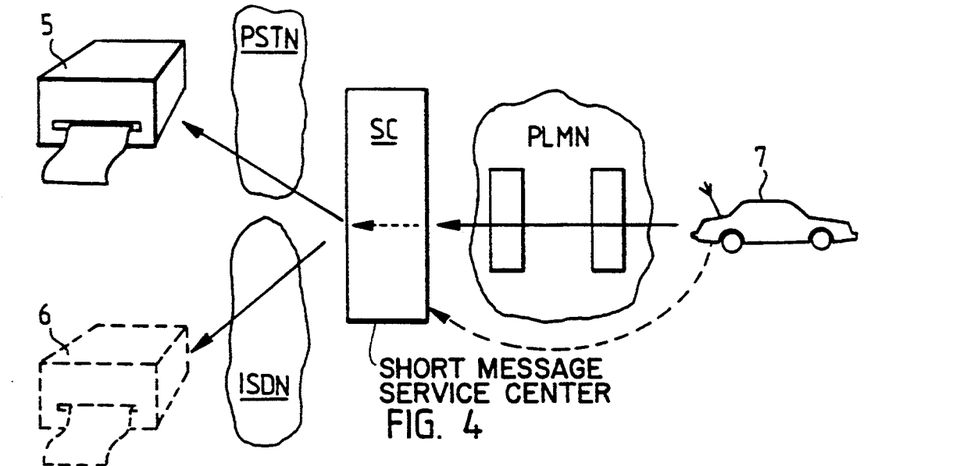
FIG. 4 shows an example of the application of the present system of the invention to other data transmission systems.

FIG. 4 shows an example of the application of the services of the system of the invention to other data transmission systems, in this case to telefax terminals 5 and 6 whereof one is a telecopier of Group III and the other a telecopier of Group IV, for instance. Telecopier 5 is shown to be connected to a service center SC through a normal public switched telephone network (PSTN), and a future telecopier 6 of Group IV (shown in broken lines) through an integrated services digital network ISDN. A mobile phone (MS) in a vehicle 7 is connected to the telefax services of the short message center SC via the signalling channel of a PLMN network. If the service center SC itself stores in its memory the communication information of the sender of the short message, it can add this to messages that do not include communication information in short message form. Thus a cover page containing the communication information of the sender can be received as a supplement to a message printed out at the telecopier, as in a normal transmission.

This is an example of how communication information and actual freely formulated short message text can be combined into a single short message. The short message center SC completes a free-content short message according to the GSM standard, sent by phone from vehicle 7, with the communication information of the sender and converts the resultant completed message to a message in facsimile form which is further sent to the desired telefax number.

In the case of telefax, this is the only possible communication direction employing short messages, but since the contact information of the sender of the short message can be printed out in the telefax message or its heading field, the recipient can call the number or send short messages through other channels, for instance by way of a short message terminal (SMT) capable of short message communication with a PLMN network.

Figure 5:
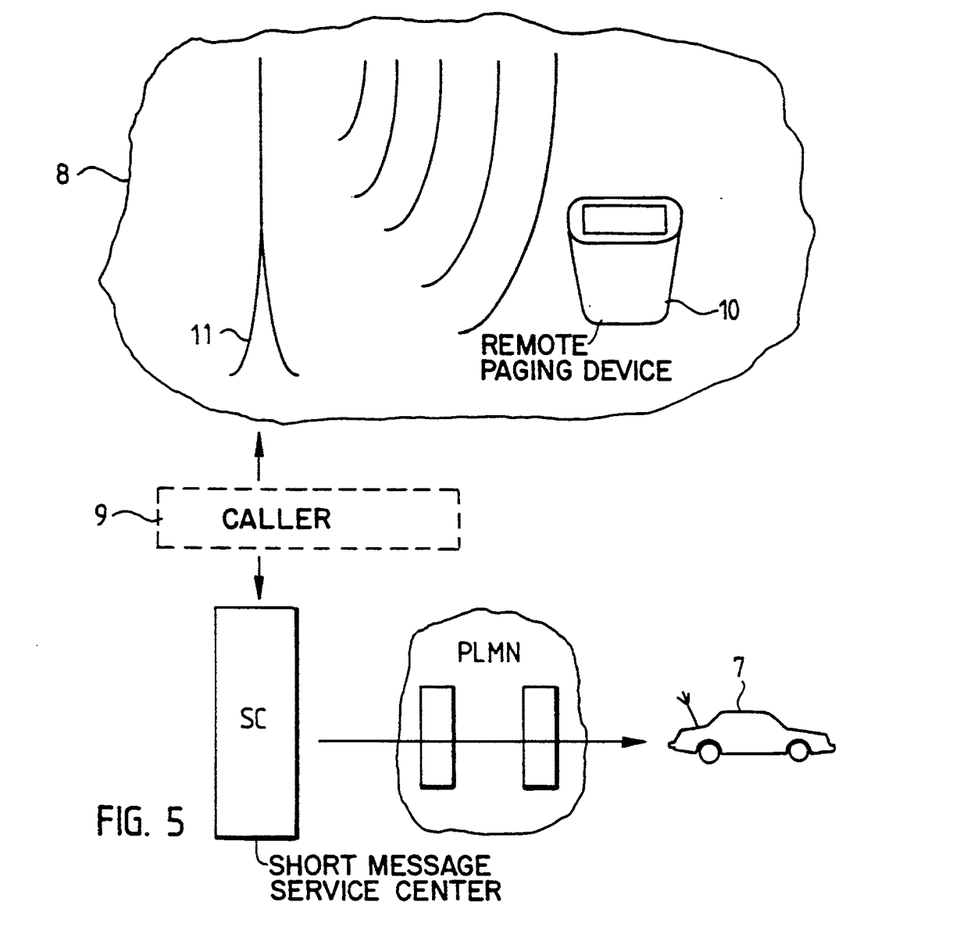
FIG. 5 shows an application of the present system of the invention to remote paging systems.

FIG. 5 shows another example of an application of the system of present invention to other types of data transmission. Here a remote paging system 8, with which a caller 9, making a call in the normal way through a telephone network or equivalent, reaches a remote paging device 10 through a radio transmitter 11. The idea herein is that the short message service center SC emulates the remote paging system 8, so that the caller can give a similar call as when the remote paging device 10 is pursued, but the call is directed for instance via an asynchronous terminal (not drawn), the service center SC, and the PLMN network to a mobile phone 7 in a vehicle. Here the communication is unidirectional as well, but in this case towards the holder of the mobile phone, since now the communication information of an external caller with respect to the PLMN network is transmitted to his telephone as a short message. Actually this service integrates the mobile phone and the remote paging device into one and the same unit.

Examples of how combined contact information and actual short message text can be sent both from an exterior system to a mobile phone and vice versa are telex communication and so-called electronic mail, wherein an adapter at a short message service center transmits and receives short telex or electronic mail messages as short messages. Because accomplishing such a system would primarily mean changing the signal routes shown in FIG. 4 to be duplex, it has not been separately drawn.

Figure 6:
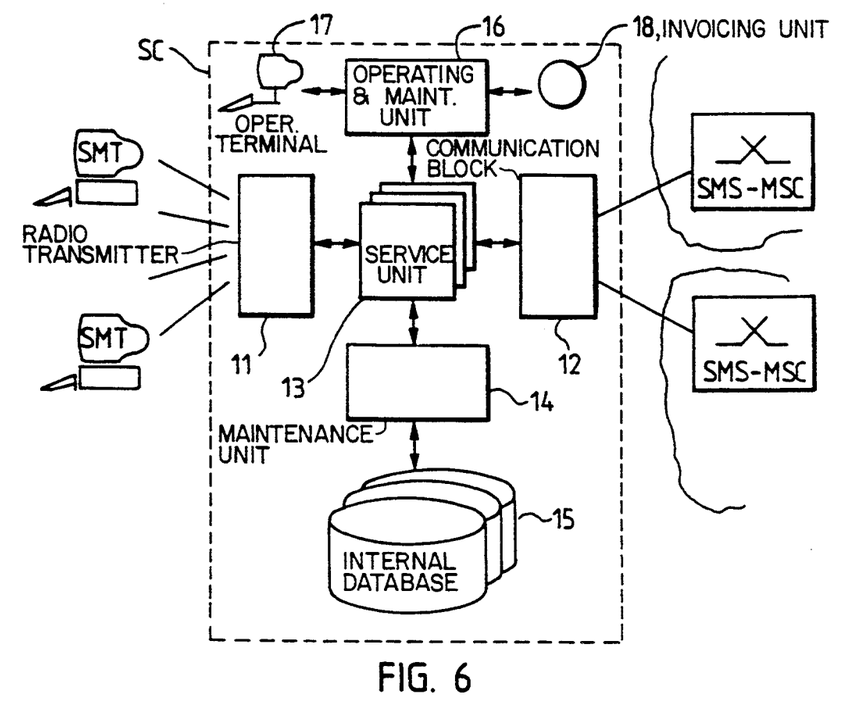
FIG. 6 shows the structure of the short message service system and its interface with a mobile phone system.

FIG. 6 illustrates the layout of the short message service system and its interfaces with a mobile phone system. The software configuration of the short message service center SC consists of a number of services which can be described as function blocks.

Blocks 11 and 12 are responsible for the communication of the SC outwards, block 11 communicates for instance via an optional telephone network or data network with short message terminals SMT, and block 12 with a mobile services switching center supporting short message service, SMS-MSC. Normally, the service center SC is either directly integrated in the mobile services switching center MSC, or it has an X.25-based connection with the local MSC, but can also establish provisional connections with more remote mobile services switching centers. Block 13 consists of the "store-and-forward" transmission of short messages and a number of services based on short messages, adding to the value of the mobile phone system, as set forth hereinabove. Block 14 is a maintenance unit of the internal database 15 of the service center SC. Block 16 is an operating and maintenance unit for the entire service station, through which the activity of the station can be managed from the operator terminal 17 and which makes printouts of different reports on the operation of the station, for instance for an invoicing unit 18.

Figure 7:
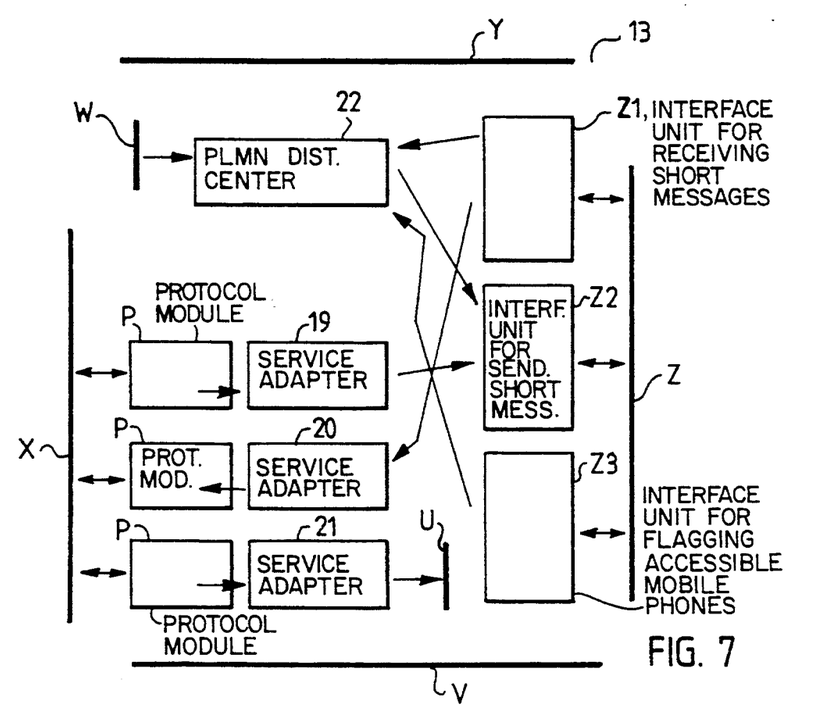
FIG. 7 shows in block diagram the service unit of FIG. 6 in a short message service center and its interfaces with the ambient system.

FIG. 7 shows in block diagram form a service unit 13 (FIG. 6) in a short message service center and its interfaces with the ambient system. The interfaces are indicated with reference characters X, Y, Z and V. Block X is a telecommunication interface outwards into the world exterior of the PLMN, the setup of which is facilitated when all service adapters 19, 20, 21 (corresponding to remote paging, telefax and X.400 connections) have protocol modules P of similar connections.

The X.400 service enables duplex short message communication between any message handling equipment and a mobile phone by way of an X.400 message handling service MHS connected to the short message service center SC. In the exchange of more extensive messages, the X.400 short message can serve as a notice of arrival for a message that has arrived in the MHS service for further measures. Such a further measure may be for instance the sending of a short message to the MHS service, with which a more extensive X.400 message is unloaded from an interface U to another equipment, for instance to a telecopier designated as a telefax message.

Interface Y is an operating and maintenance interface and Z is an MSC communication interface. This interface is divided into three units, receiving of short messages Z1, sending of short messages Z2, and flagging of the mobile phones accessibility Z3. These three services based on the MSC interface are controlled in a PLMN distribution center which for instance routes MO short messages forward as MT messages under the control of the operating and database functions of the service center SC. The PLMN distribution center can also serve as a relay station for other than MO short messages, generated by the different services, by way of its W interface, in which situation it will send the messages further to mobile phones as MT messages.

Interface V is an interface for database functions (cf. FIG. 6). If the communication information is stored in the database of some other system than the internal database of the SC, it must be possible to communicate with the other system through this interface.

Figure 8A:
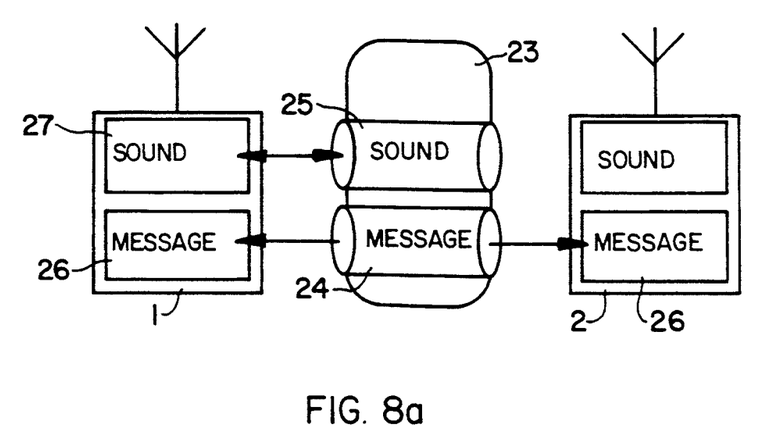
FIGS. 8a and 8b show one embodiment of the present invention in a public integrated services network.
Figure 8B:
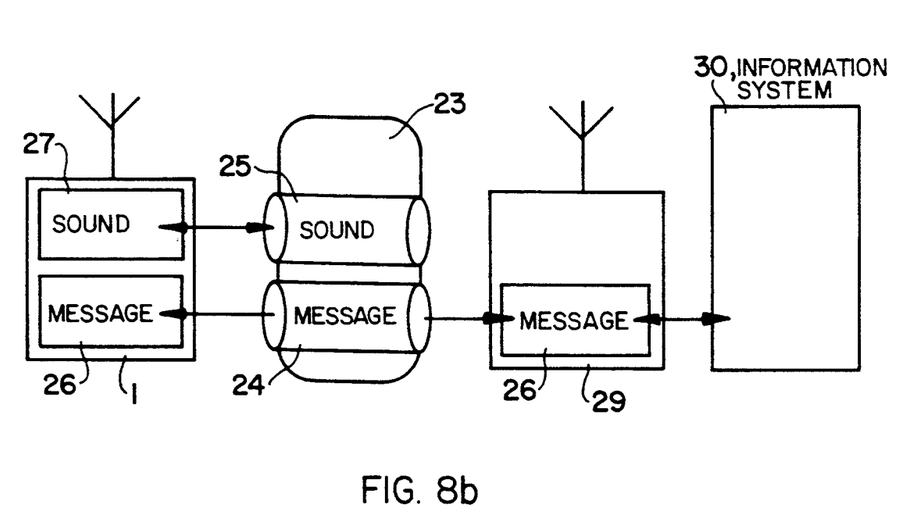

In the embodiment according to FIGS. 8a and 8b, the essential feature is that the units of terminal equipment 1 and 2 are connected to a public integrated services network 23, which in addition to a message service 24 supports normal voice communication over sound channels 25. Thus the normal terminal devices 1 and 2, such as conventional GSM telephones as shown in FIG. 1, can communicate with one another in the integrated services network using both the sound channels 25 and message service channels 24 of the network 23, making use of their built-in message and sound processing equipment 26, 27.

FIG. 8b specifically highlights the fact that in some cases, one of the terminal equipment units 29 may be for instance an automatic system, supporting only a message service 24 and containing only a message service interface 26. The terminal equipment 29 is connected, for instance, to an information system 30, and thus the information contained in said information system can be inquired by way of terminal equipment 1. A concrete example of such an information system is a stock exchange information system, for which data can be inquired by any holder of a normal terminal equipment 1 (a GSM telephone), without any supplementary equipment or special operations.

Figure 9:
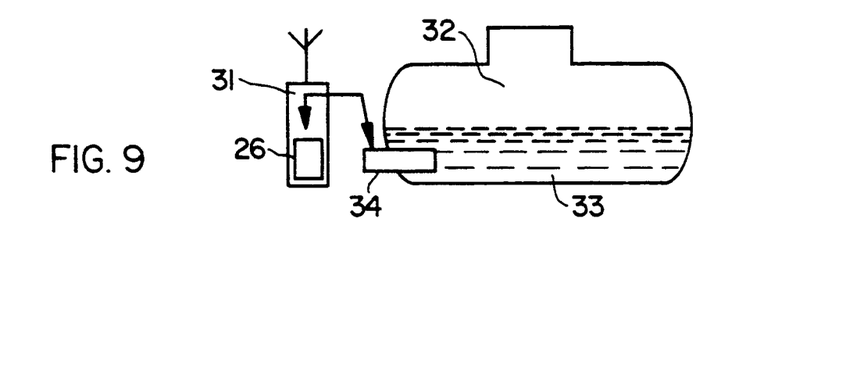
FIGS. 9 to 11 show another embodiment of the present invention wherein the message switching service of the integrated services network is applied to an automatic information system.

FIG. 9 shows another example of an embodiment of the invention wherein one of the terminal equipment units is automatic. Reference 32 denotes, for instance, a heating oil tank for a house, in which a sensor 34 monitors the amount of oil 33 in the tank. The sensor is connected to a terminal equipment unit 31 of an integrated services network, the terminal equipment being provided with a messaging feature 26, so that the terminal equipment is capable of replying to a message-based query concerning the amount of the oil.

Figure 10:
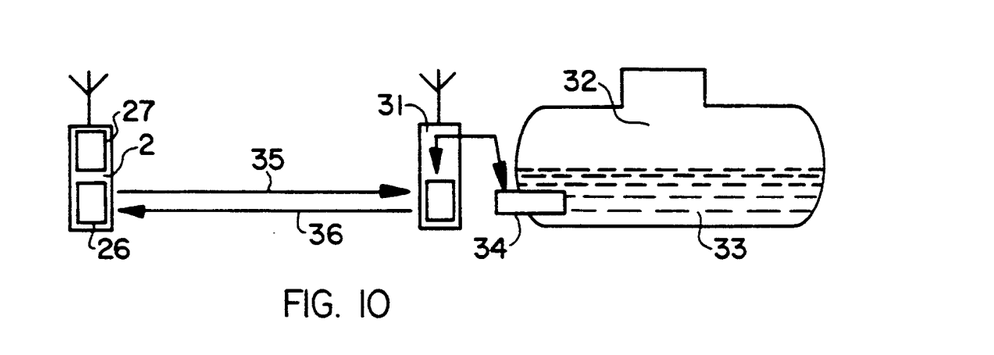

FIG. 10 shows a situation corresponding to FIG. 9 wherein the integrated services network is for instance a GSM land mobile network, and wherein the person responsible for the heating of the house is able at any time to execute with his GSM mobile phone 1 a query (arrow 35), in reply (arrow 36) to which he receives the amount of the oil 33 in the tank 32, in short message form.

Figure 11:
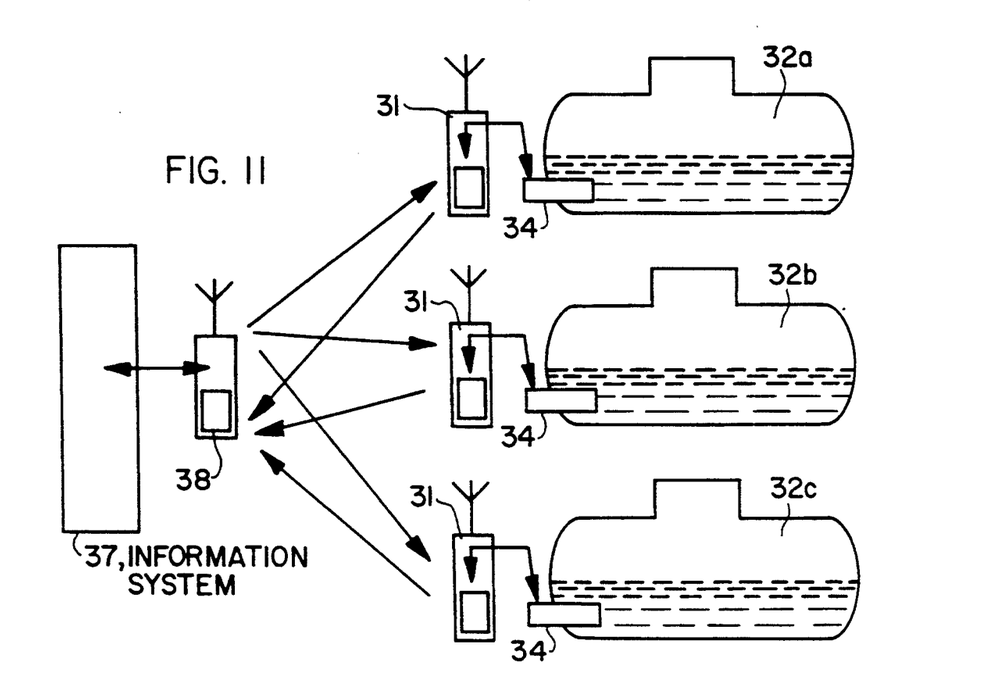

FIG. 11 shows an example of an embodiment of the invention wherein both terminal equipment units are automatic, again in the environment shown in FIGS. 9 and 10. Therein the information system 37 of a heating oil company can automatically inquire the amounts of oil in the oil tanks 32a, 32b and 32c of the houses attended to by the company, using the radio set of an automated GSM mobile phone 38. In the houses, heating systems furnished with terminal equipment 31 in accordance with FIG. 10 reply to the queries by indicating the amount of oil in the respective tank by short message, regardless of whether the inquirer is for instance the caretaker with his GSM phone or the oil company by way of its information system. This arrangement makes possible the transfer of responsibility for the amounts of oil in the tanks to the oil company. The information system 37 can be fixed or can be located for instance in an oil distribution vehicle. At any rate, the system of FIG. 11 opens up completely new horizons for optimizing distribution operations, for instance. Incorporation of equivalent features is not possible without the two important characteristics that constitute the invention, an integrated services network including a message switching service and the possibility of making message-based queries using normal terminal equipment. In the known solutions, the query systems need their own data transmission networks and their own terminal equipment.

Figure 12:
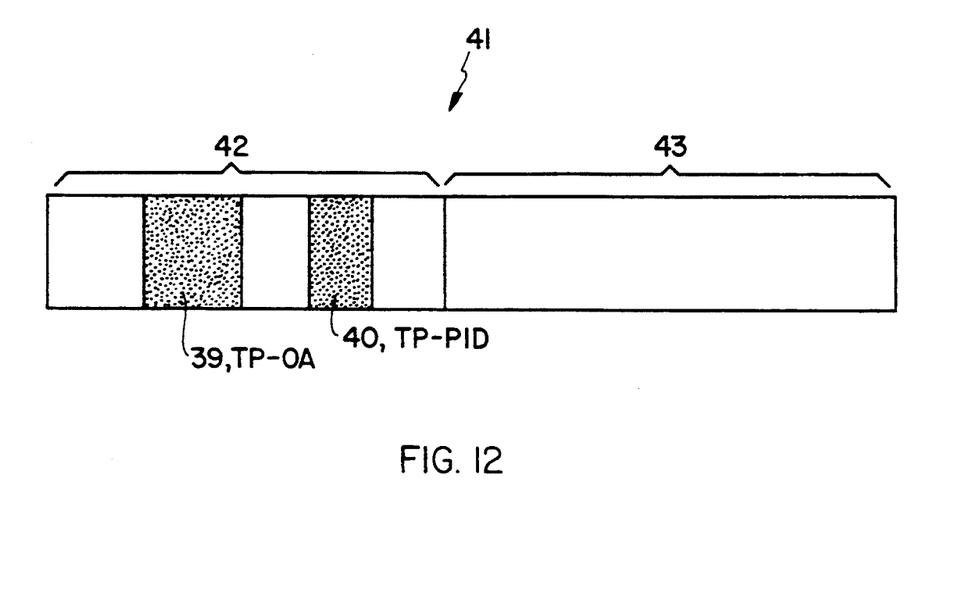
FIGS. 12 and 13 show a query message of an integrated services network and its content.
Figure 13:
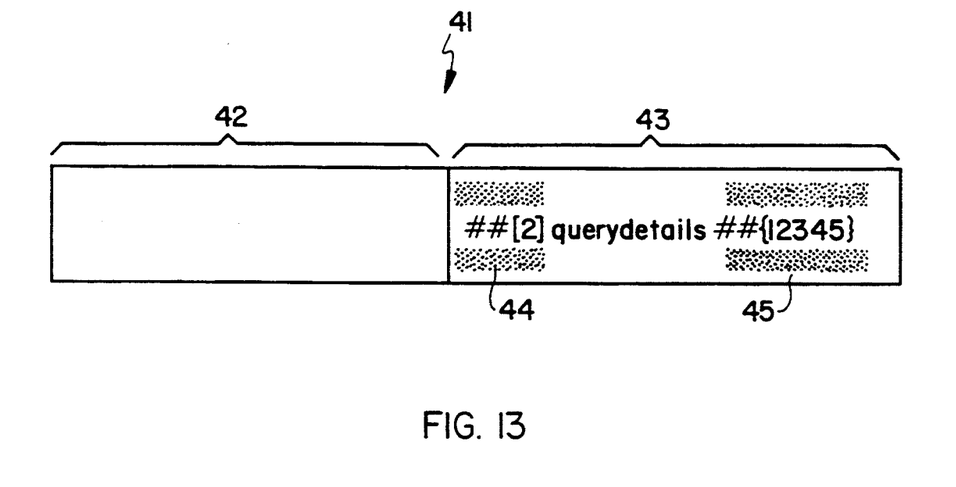

FIGS. 12 and 13 show the layout of the messages in the integrated services network. The content of the message 41 is usually divided into heading information 42 and useful content 43. The division of the heading information into different fields and in part also its content is determined by the applicable message switching service, whilst the useful content can be freely determined by the units of terminal equipment or their users. For instance in the GSM short message service, a mobile phone receives the message in the format shown in FIG. 12, in which situation the heading information 42 of the message contains the address of the transmitting terminal equipment in field 39, and in field 40 an identification of the protocol, service, or equivalent. If the message is a query message, the telephone to which the message is addressed will find the equipment that has made the query in address field 39, and thereby also a reply address. On the other hand, the content of field 40 can indicate that the query message is a message of a certain query application.

While FIG. 12 is an example of how the reply address and the address of the query message can be included in the heading information of the message, in the message layout of FIG. 13 the identification 44 and the reply address 45 for the query message are included in the useful content of the message. In FIG. 13, it has been assumed that the useful content of the message is in character form, in which situation certain character sequences (in the Figure, ##[]and ##{}) differentiate the identification (2) and the address (12345). The terminal equipment replying to the query will go through the content of the message character for character, identify a query message on the basis of identification 44, and reply to address 45. Naturally, corresponding technology can also be applied when the useful content of the message has not been coded with any character set; however, character coding has the advantage that the message can also be construed by man as a query message, if for some reason the terminal equipment should not be capable of supporting the query application.

Thus a special case is a query message application in which the replying terminal equipment interprets all messages that have arrived as query messages, and thus no query message identification is needed in the messages. In that situation, the appropriate terminal equipment utilizes the message switching service of the integrated services network only for receiving and replying to the queries.

Still another feature of the invention relates to the protection of the terminal equipment. It is possible to agree that the network has general queries defined therein, to which queries each terminal equipment always replies with a certain reply message containing public information, such as the communication information of the user. It is also possible to agree between two or more users that certain information is only given when the identification of the query message is of a private type agreed upon between the users of the terminal equipment, or that one or several message records are sent to the same recipient at a time. The terminal equipment can also be programmed to reply to query messages only when the reply address contained in the query message has been stored in the terminal equipment in advance, or if the password contained in the query message corresponds to a password stored in advance in the terminal equipment.

Correspondingly, the communication information of each terminal equipment connected to the message switching service of the integrated services network can be updated by way of an addressed message to those units of terminal equipment the addresses of which are in the internal telephone catalog of said terminal equipment.

It is evident to one skilled in the art that the different embodiments of the invention are not restricted to the examples set forth above, but they can vary freely within the scope of the appended claims.

I claim:

1. A method for relaying information in an integrated services network in which network a message switching service is operative between terminal equipment units connected to the network, said method comprising the steps of:

using a terminal equipment unit of the network to send a query message to inquire information, via the network, of another terminal equipment unit connected to the network, said query message including at least a replay address;

said another terminal equipment unit generating a reply message in response to the query message; and automatically transmitting the replay message to the reply address via the message switching service of the network; the query message being one of a plurality of query types on the basis of which said another terminal equipment unit can identify the type of query messages being transmitted on the network by any of the terminal equipment units, said query message containing identification information corresponding to the type of query message with which it is related.

2. The method of claim 1, wherein when said one query type is a general query type of the type understood by users of the terminal equipment units connected to the network, the reply message generated by said another terminal equipment unit is a certain reply message containing public information.

3. The method of claim 1, wherein when said one query type is of a type agreed upon by users of the terminal equipment units connected to the network, the replay message generated by said another terminal equipment unit is a certain replay message containing information agreed to be shared by said user.

4. A method for relaying information in an integrated services network in which network a message switching service is operative between terminal equipment units connected to the network, said method comprising the steps of:

using a terminal equipment unit of the network to send a query message to inquire information, via the network, of another terminal equipment unit connected to the network, said query message including at least a reply address;

said another terminal equipment unit generating a reply message in response to the query message; and automatically transmitting the reply message to the reply address via the message switching service of the network; said message switching service being composed of a message switching service center which enables communication between terminal equipment units and communication devices outside the integrated services network, said message service center including a plurality of service modules, said service modules providing at least one way communication by converting short messages transferred over a digital signal processing channel of the integrated services network, to a format intelligible to said communication devices.

5. The method of claim 4, wherein said message switching center includes an adapter providing telefax transmission in message form from said terminal equipment units.

6. The method of claim 4, wherein said message switching center includes an adapter routing a remote paging call to a selected terminal equipment unit in message form.

7. The method of claim 4, wherein said message switching center includes an adapter providing X.400 communications in message form.

8. The method of claim 4, wherein said message switching center includes an adapter for sending and/or receiving short telex communication messages.

9. The method of claim 4, wherein said message switching center includes an adapter for sending and/or receiving electronic mail messages.

10. A method for relaying information in an integrated services network in which network a message switching service is operative between terminal equipment units connected to the network, said method comprising the steps of:

using a terminal equipment unit of the network to send a query message to inquire information, via the network, of another terminal equipment unit connected to the network, said query message including at least a reply address;

said another terminal equipment unit generating a reply message in response to the query message; and automatically transmitting the reply message to the reply address via the message switching service of the network; said terminal equipment units being mobile phones and said query message including communication information transmitted via a short message service of a digital land mobile network.

11. The method of claim 10, wherein communication information from a mobile phone connected to the short message service of the digital land mobile network is updated by means of a cell broadcast to all mobile phones operating under the same cell.

* * * * *

UNITED STATES PATENT AND TRADEMARK OFFICE
CERTIFICATE OF CORRECTION

PATENT NO. : 5,351,235
DATED : September 27, 1994
INVENTOR(S) : LAHTINEN, Pekka

It is certified that error appears in the above-indentified patent and that said Letters Patent is hereby corrected as shown below:

On the title page, under item [86], correct the PCT No. to read --PCT/FI92/00035--.

Signed and Sealed this

Third Day of January, 1995

Attest:

BRUCE LEHMAN

Attesting Officer     Commissioner of Patents and Trademarks